US005894119A

United States Patent [19]

Tognazzini

[11] Patent Number: 5,894,119
[45] Date of Patent: Apr. 13, 1999

[54] DEVICE FOR ENABLING LISTENERS TO PREVIEW MUSIC RECORDINGS

[75] Inventor: Bruce Tognazzini, Woodside, Calif.

[73] Assignee: Sun Microsystems, Inc., Palo Alto, Calif.

[21] Appl. No.: 08/680,500

[22] Filed: Jul. 1, 1996

[51] Int. Cl.[6] ............................................. G06F 17/00
[52] U.S. Cl. ............................. 235/375; 235/383; 235/472
[58] Field of Search .................................. 235/375, 383, 235/472

[56] References Cited

U.S. PATENT DOCUMENTS 4,481,412  11/1984  Fields ........................................ 235/383
5,237,157  8/1993  Kaplan ...................................... 235/375
5,510,606  4/1996  Worthington et al. ..................... 235/472

*Primary Examiner*—Harold Pitts
*Attorney, Agent, or Firm*—McDermott, Will & Emery

[57] ABSTRACT

A bar code reader, a wireless transceiver, an earphone jack and a battery are integrated into a pen sized device. The bar code reader is used to scan the product identification code or music packaging. The product code is sent to a central computer or a music store where one or more stored digital samples of the music reside in a database. One or more music samples are retrieved and sent to the pen sized device where the sample is converted to audio signals for listening by a user over the earphone jack.

4 Claims, 12 Drawing Sheets

DEVICE FOR ENABLING LISTENERS TO PREVIEW MUSIC RECORDINGS

BACKGROUND OF THE INVENTION

1. Field of the Invention

The invention relates to the sampling of recorded music and, more particularly, to a bar code indexed retrieval system for providing a user with music samples which they can hear in earphones connected to a pen sized bar code scanner.

2. Description of Related Art

Traditional music stores are beginning to face competition from on-line services. The new services can offer music sampling so that shoppers can hear sample cuts from an album before ordering. Traditional stores are trying to compete by setting up stations where users can insert disks they are contemplating buying and listen to various selections, in much the way record albums were merchandised years ago. This solution, however, is cumbersome for the buyer, since they have to travel across a store to listen, and cumbersome for the dealer, since they have to re-shrink-wrap the disk listened to but not purchased.

The Problems

Music stores have a need to permit potential buyers to hear samples of music from an album before buying it, without the packaging problems associated with opening the album. A user's curiosity about the contents of an album is transitory and unless a sample of the music is quickly available, the user's interest may wane.

SUMMARY OF THE INVENTION

The invention relates to a music sampling apparatus that looks like a fat writing pen. A set of headphones plugs into the back end of the pen. The point end of the pen is a bar code scanner. In between is a microprocessor, and a two-way infra-red (IR) or radio transceiver, and a rechargeable power source.

In operation, a customer, upon entering a store, checks out or picks up one of the devices. When a CD or a cassette tape is found to be of interest, the user runs a pen across the bar code on the album. If the bar code reader finds a valid number, the pen beeps.

The music sampling apparatus sends the bar code data to the store's computer. This computer either holds music samples of each album sold in the store or is connected to a more central computer that holds the samples. The store's computer then downloads the sample to the bar code wand, where they are played for the user. Typically these samples are of roughly twenty seconds duration. To permit listening to multiple samples, a user can press a button located beneath the index finger to leaf through additional samples.

The advantage of this system is that the original album remains shrink-wrapped and the user need not move from where he or she is browsing. The user would no longer need to be serious about a particular album before deciding to review it. The music sampling apparatus would tend to result in increase sales of lesser-known groups and albums.

The same type of mechanism could be incorporated into a kiosk, rather than a portable device. This would offer the benefit of increased security, since a kiosk is more difficult to steal and perhaps increase durability. However, these benefits would be achieved at the costs of the loss of many of the benefits of the portable device.

The invention relates to apparatus for sampling music, including a bar code reader, a transmitter/receiver for receiving product information from the bar code reader and transmitting it to a remote location and receiving back music samples, and an audio output for receiving the music samples and providing them to a listener. The apparatus is in the shape of a pen and the bar code reader is positioned at the point of the pen. The transmitter/receiver is a wireless transmitter/receiver and can use infrared or radio. A selector switch is available for requesting different samples. The apparatus can be embodied in a kiosk. The apparatus can be computer controlled.

The invention also relates to apparatus for providing music samples, including a database of music samples indexed by product identification, and a transmitter/receiver for receiving a product identification from a remote station and providing one or more music samples from the database to the remote station. The bandwidth of a communications link over which the product identification is received is smaller that the bandwidth of a communications link over which the music samples are provided.

In a preferred embodiment, each remote station is assigned a frequency different from other remote stations in the vicinity.

The invention also relates to a method of sampling music, by sending a product identification derived from music packaging to a computer, and receiving back music from a product bearing that product identification and providing the music to a user over a headphone jack.

The invention also relates to a system for providing product information to customers in a store, including a central computer storing product information, and a plurality of handheld devices, each configured to read bar codes on products, transmit the bar code to the central computer and receive back the product information. The handheld devices and the central computer may be connected over a network or over a wireless link.

The invention also relates to a computer program product, including a memory medium and a computer program stored on the memory medium, the computer program containing instructions for receiving product identification information derived from product packaging and sending back product information for a product identified by the product identification information.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The objects, features and advantages of the present invention will be apparent from the following description, in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
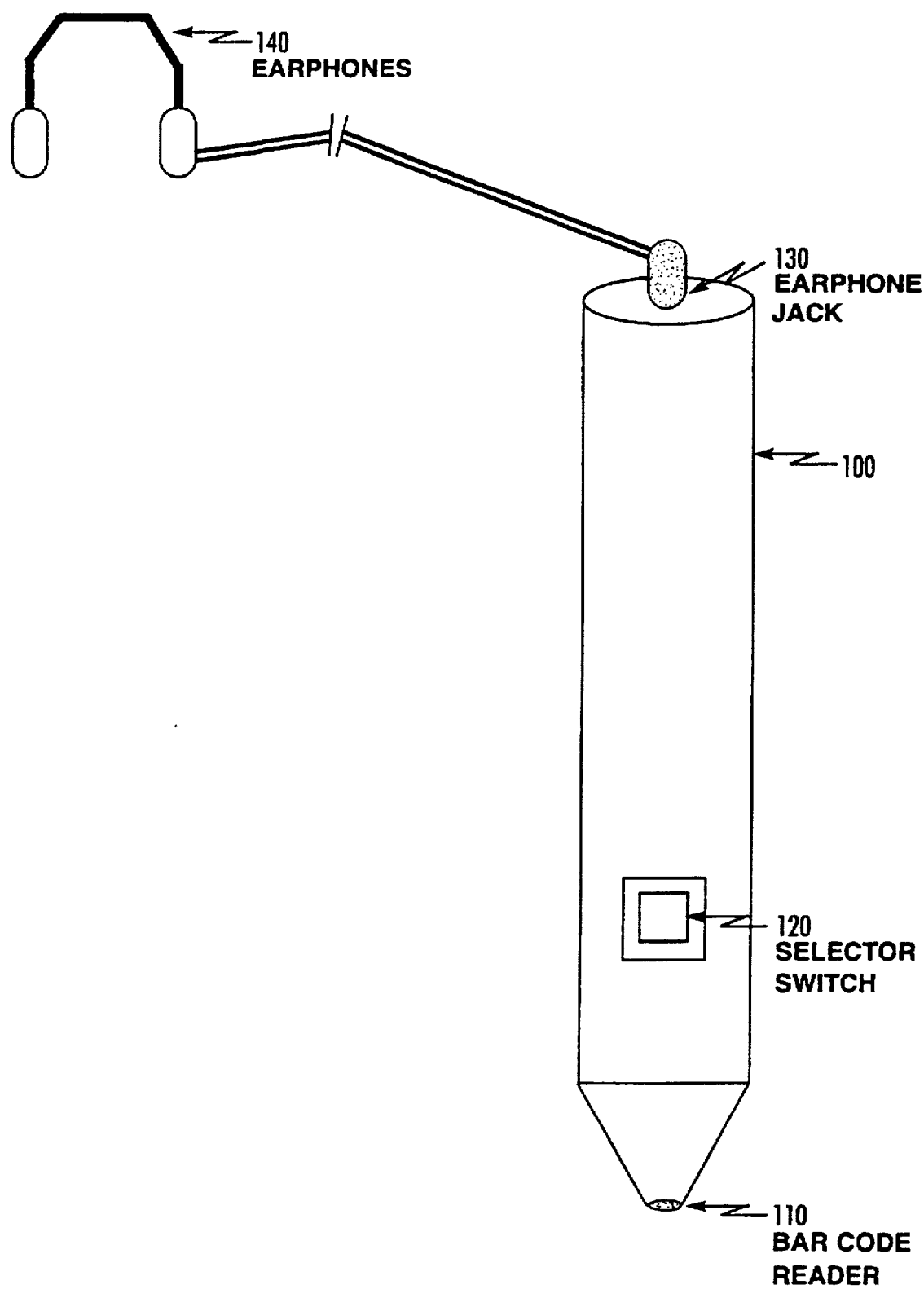
FIG. 1 is an example of a music sampling apparatus in accordance with the invention.

FIG. 1 is an example of music sampling apparatus in accordance with the invention. Music sampling apparatus 100 is shaped somewhat like a fat pen having a bar code reader 110 for reading bar codes on music products. A selector switch 120 is utilized to cycle through available samples for a particular piece of music or to affirmatively specify the number of the music piece to be sampled. In the latter alternative, a numeric display might be useful to enable the user to cycle to a number which corresponds to a particular selection on the CD ROM or cassette tape. An earphone jack 130 is located at the rear of the selection apparatus and an earphone plug is inserted into the earphone jack to connect a set of earphones 140 to the music sampling device. A battery for powering the music sampling device is contained within the tube of the device, but is not shown.

Figure 2:
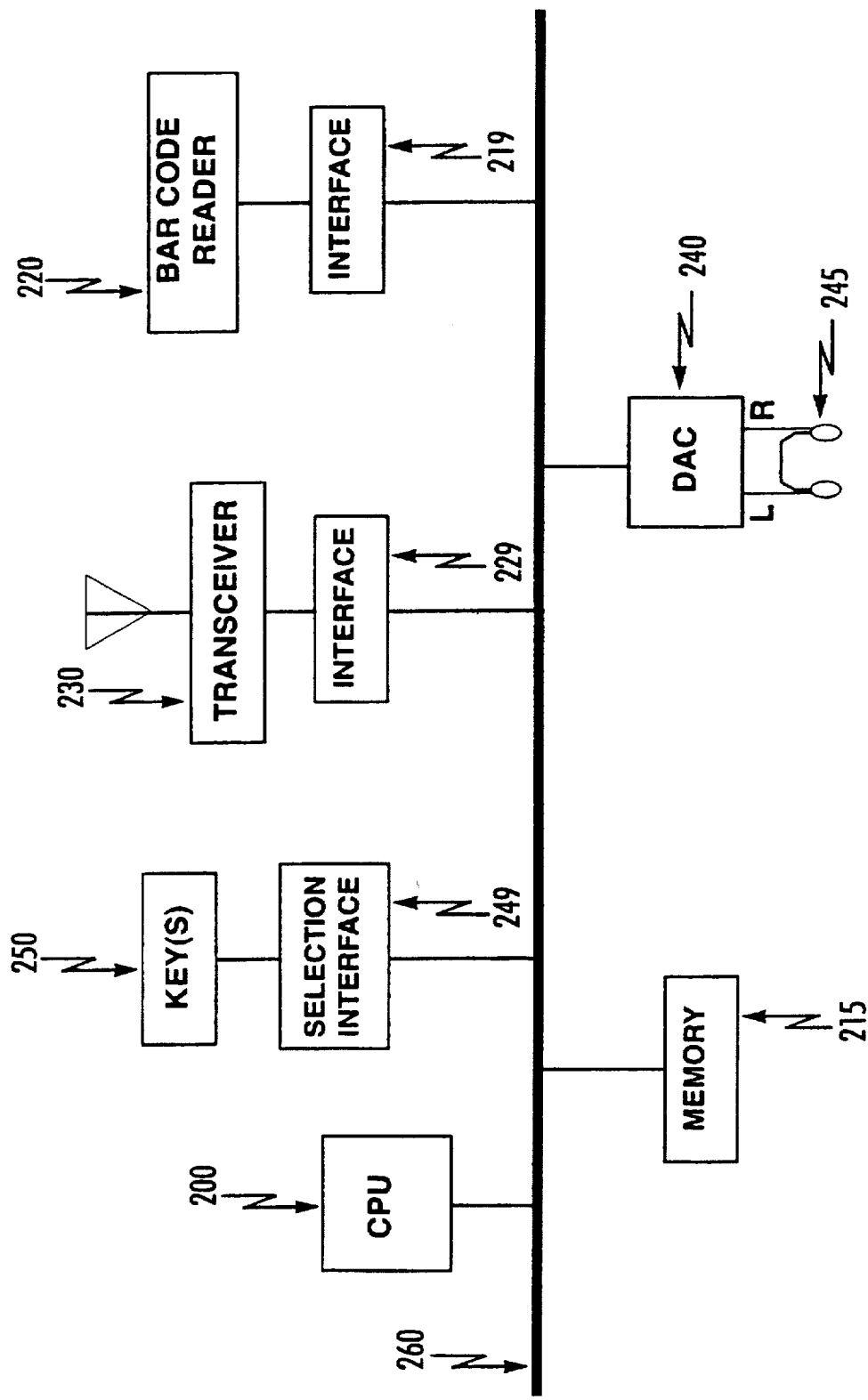
FIG. 2 is a block diagram of the construction of the music sampling device of FIG. 1.

FIG. 2 is a block diagram of the construction of the music sampling device of FIG. 1. A processing unit 200 is connected to bus 210 and controls the other items connected to the bus. A bar code reader 220 is connected to the bus over interface 219. A transceiver 230 is connected to the bus over interface 229. One or more keys 250 are connected to the bus over a selection interface 249. Memory 215 stores the instructions and data items needed for carrying out the functionality of the invention. Digital analog converter 240 connect to the bus and provides information to left and right earphones of headset 245.

Figure 3A:
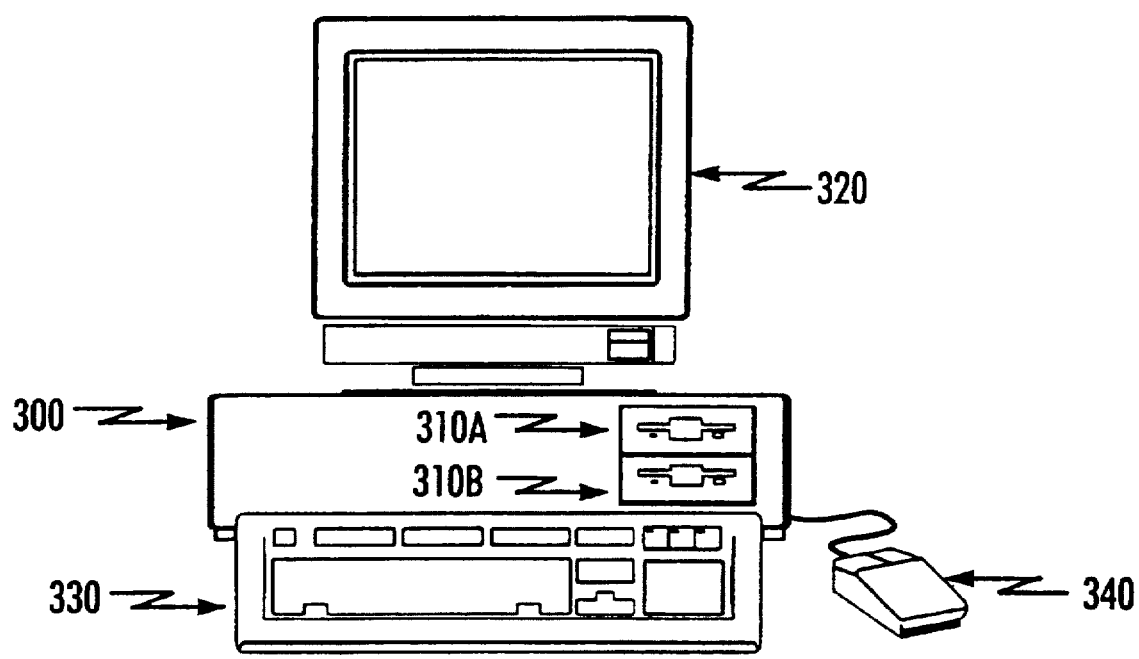
FIG. 3A is an example of a store computer suitable for use in accordance with the invention.

FIG. 3A illustrates a computer of a type suitable for carrying out the invention. Viewed externally in FIG. 3A, a computer system has a central processing unit 300 having disk drives 310A and 310B. Disk drive indications 310A and 310B are merely symbolic of a number of disk drives which might be accommodated by the computer system. Typically, these would include a floppy disk drive such as 310A, a hard disk drive (not shown externally) and a CD ROM drive indicated by slot 310B. The number and type of drives varies, typically, with different computer configurations. The computer has the display 320 upon which information is displayed. A keyboard 330 and a mouse 340 are typically also available as input devices. Preferably, the computer illustrated in FIG. 3A is a SPARC workstation from Sun Microsystems, Inc.

Figure 3B:
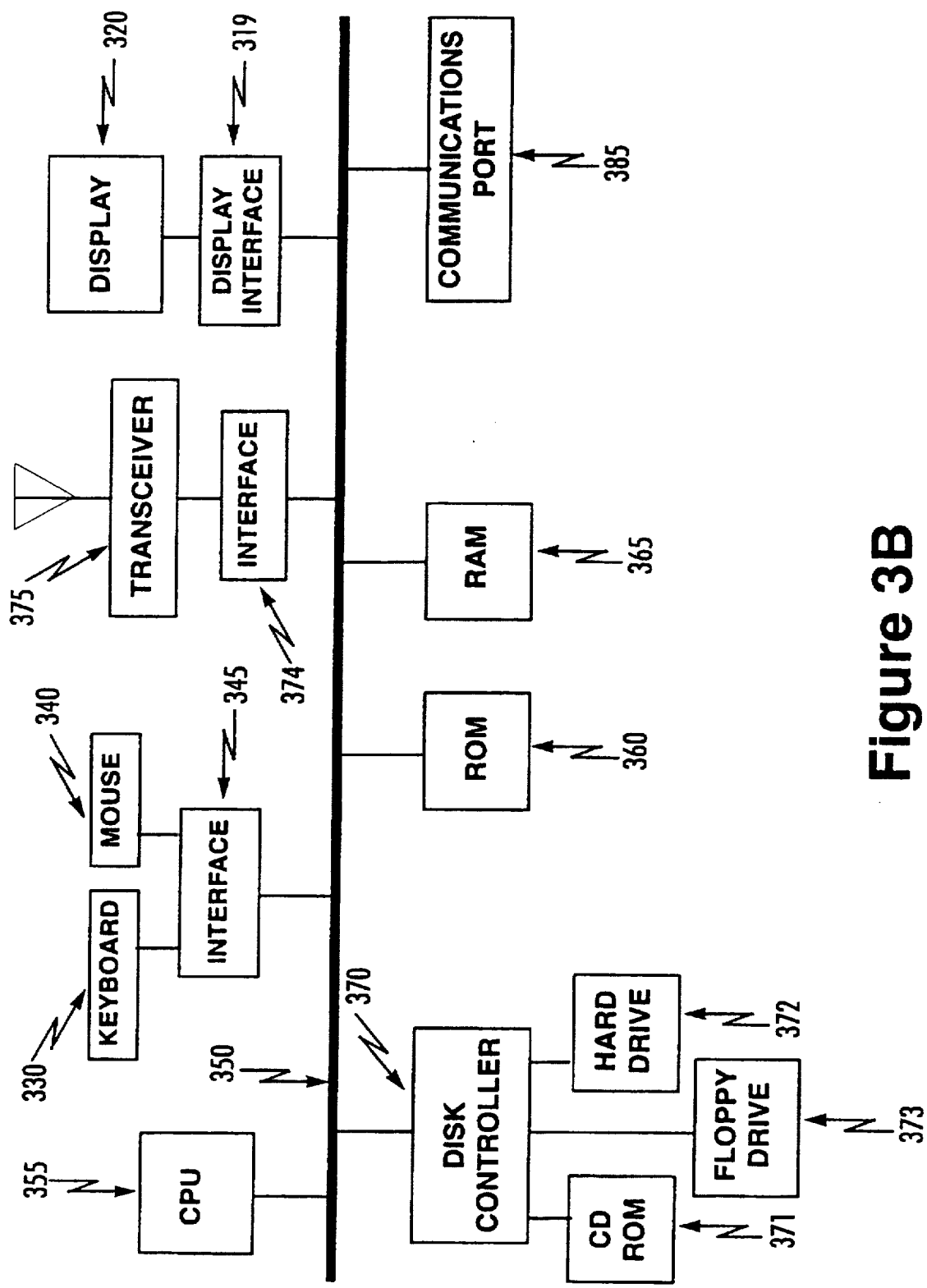
FIG. 3B is a block diagram of the construction of a store computer of FIG. 3A.

FIG. 3B illustrates a block diagram of the internal hardware of the computer of FIG. 3A. A bus 350 serves as the main information highway interconnecting the other components of the computer. CPU 355 is the central processing unit of the system, performing calculations and logic operations required to execute programs. Read only memory (360) and random access memory (365) constitute the main memory of the computer. Disk controller 370 interfaces one or more disk drives to the system bus 350. These disk drives may be floppy disk drives, such as 373, internal or external hard drives, such as 372, or CD ROM or DVD (Digital Video Disks) drives such as 371. A display interface 319 interfaces a display 320 and permits information from the bus to be viewed on the display. Communications with external devices can occur over communications port 385. Transceiver 375 is linked to the bus over interface 374.

Figure 3C:
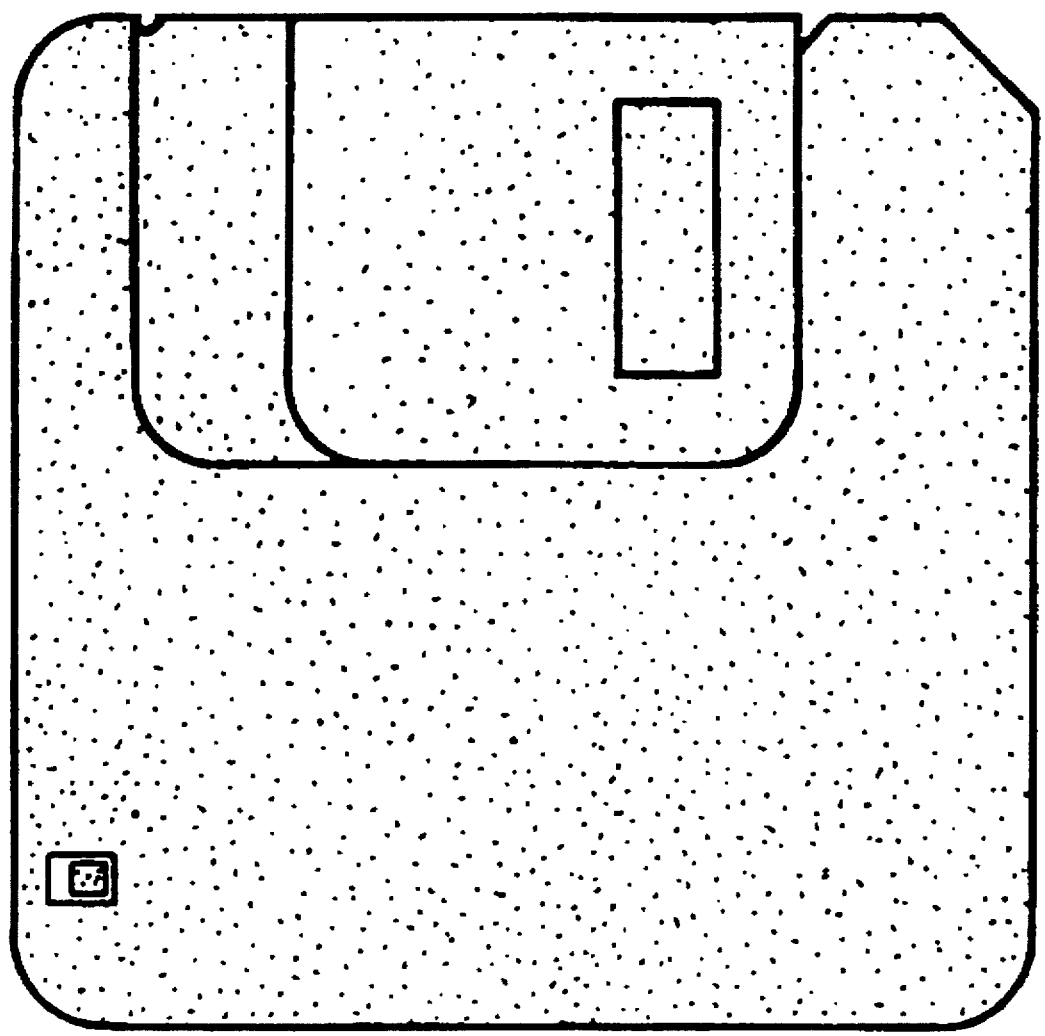
FIG. 3C illustrates an exemplary memory medium usable with the store computer of FIG. 3A.

FIG. 3C illustrates an exemplary memory medium which can be used with drives such as 373 in FIG. 3B or 310A in FIG. 3A. Typically, memory media such as a floppy disk, or a CD ROM, or a Digital Video Disk will contain the program information for controlling the computer to enable the computer to perform its functions in accordance with the invention.

Figure 4:
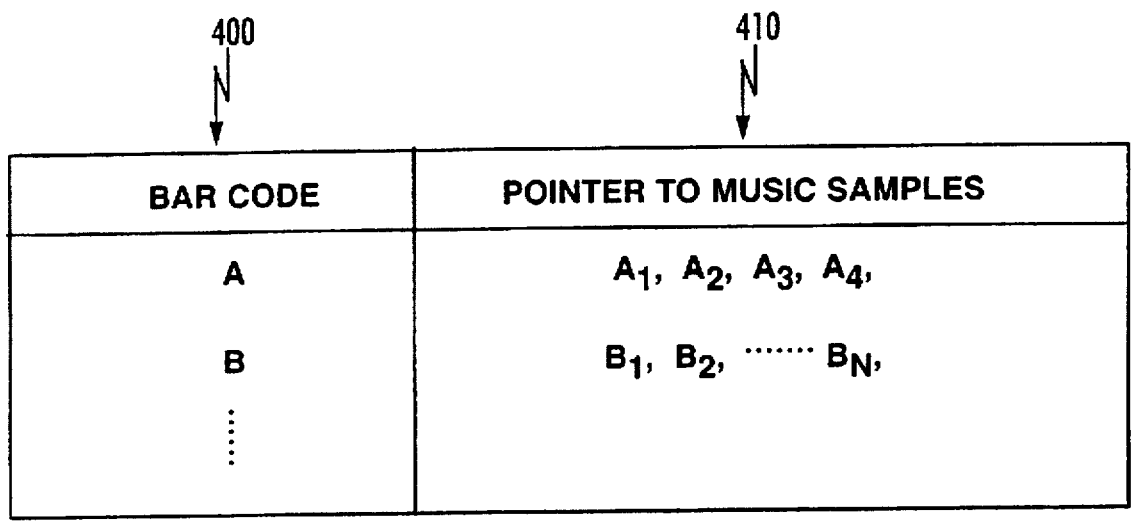
FIG. 4 is an exemplary database used in implementing the invention.

FIG. 4 is an exemplary database used in implementing the invention. The database contains two fields, the first is a bar code field which lists the bar code for each product stocked in the store and, relating to the bar code, there is a field for pointers to music samples identified by the bar code. The pointer music samples shown with respect to bar code A is a four element set of samples. The bar code identified as B has a different pointer set associated with it. Each one of the song titles on the music (e.g. CD ROM or cassette tape) is stored in memory are neither the same database storing the fields of FIG. 4 or as a separate database storing music samples. In operation, a user may cycle through each of the samples as shown, for example, in association with bar code A and have them played. With the example shown in bar code B, a pointer to music stored in a related data base is maintained for each song on the title. Thus, using the mode associated with bar code B, one could select and have a sample of any song on the product.

Figure 5:
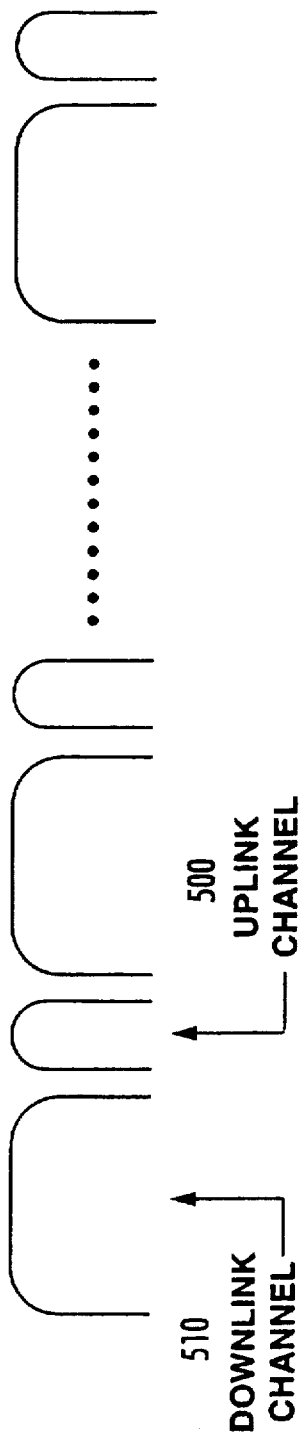
FIG. 5 illustrates an exemplary spectrum allocation useable by radio transceivers in implementing the invention.

FIG. 5 illustrates an exemplary spectrum allocation usable by transceivers in implementing the invention. As shown in FIG. 5, a relative narrow band uplink channel 500 is utilized in conjunction with a relatively broad band downlink channel 510. The data sent by a music sampling apparatus to the store computer is relatively simple and does not require much bandwidth. However, the relatively high fidelity sound being sent from the store computer down to the music sampling device for a user to hear needs to have greater bandwidth so that the music will not sound distorted. A plurality of pairs of uplink and downlink channels are utilized to service a given store.

Figure 6:
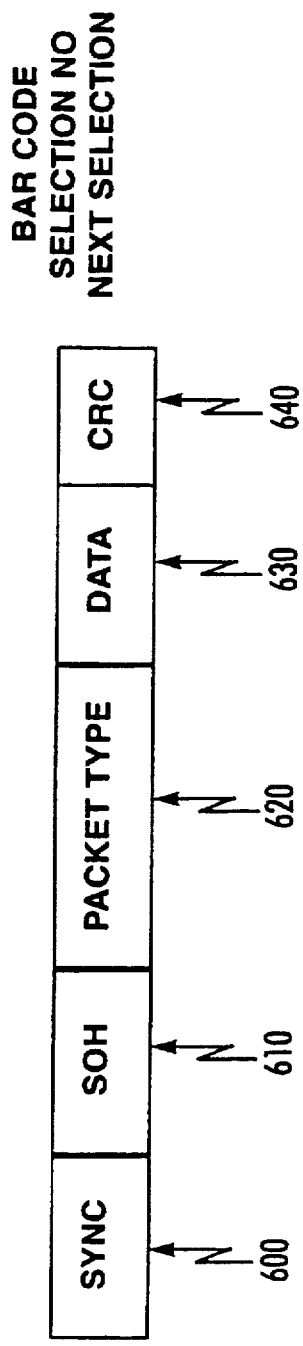
FIG. 6 is an exemplary packet format used in communicating information in accordance with the invention.

FIG. 6 is an exemplary packet format used in communicating information in accordance with the invention. As shown in FIG. 6, the start of each packet is a synchronization portion 600. A start of header packet, 610, then indicates the beginning of substantive information. The packet type 620 is one of a bar code, a selection number or a "next selection" command. These three packets are typical of the packets needed to carry out all aspects of the invention. The use of these various packet types is discussed more hereinafter. A data section 630 also forms part of the packet. At the end of the packet, a cyclic redundancy code (CRC) is displayed. As one can see from the types of packets, these are not invoked frequently and therefore do not load the system inordinately.

A data packet is also defined for the downlink direction having essentially the same format as that described above. The downlink packets might require as much as 128 kilobits per second to provide a high fidelity reproduction signal. The uplink packets however are sent much less frequently. That is why the uplink channel is of narrower bandwidth from the downlink channel.

Figure 7:
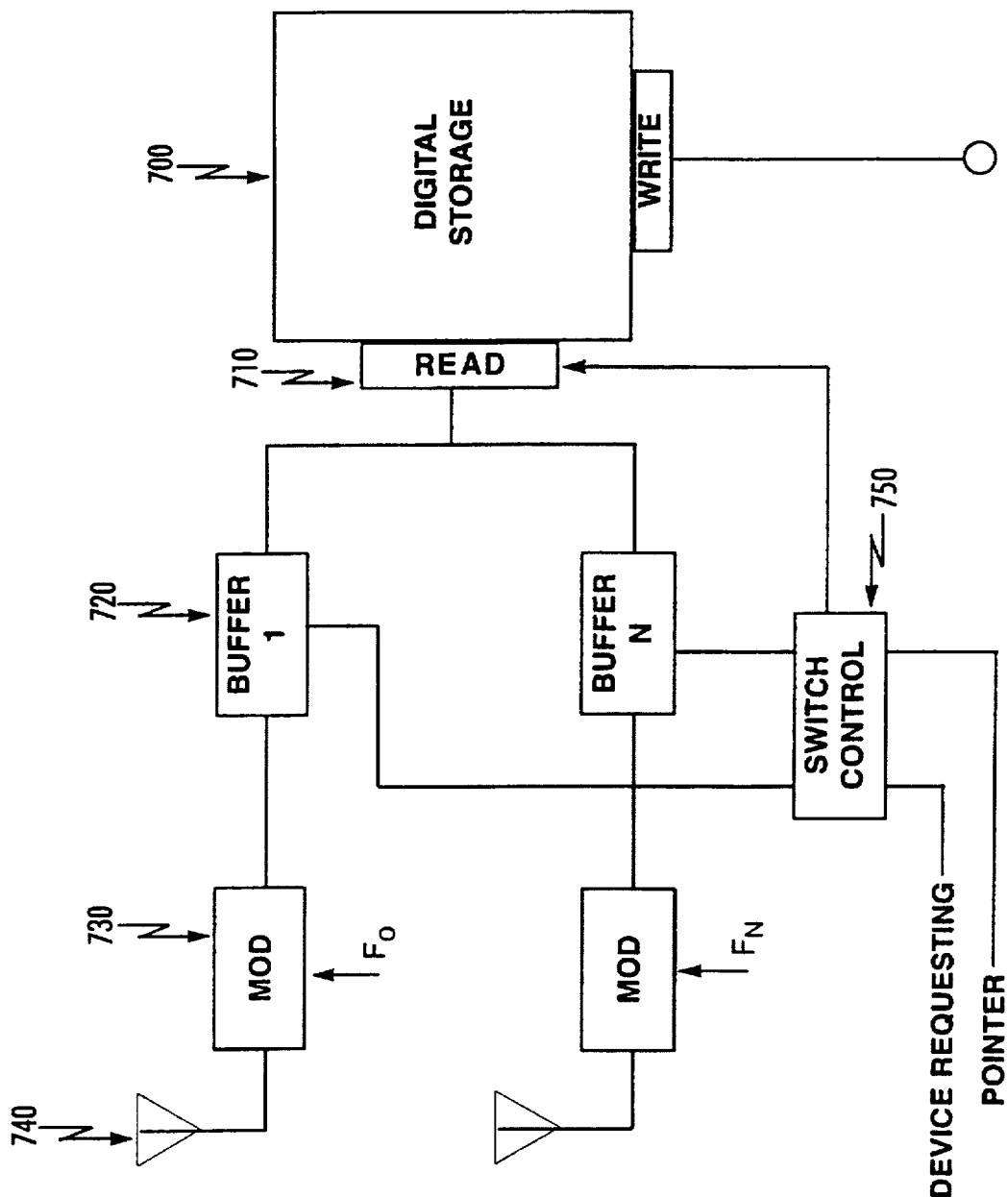
FIG. 7 is a block diagram of a central transmission facility for sending music samples to music sampling apparatuses.

FIG. 7 is a block diagram of a central transmission facility for sending music samples to music sampling apparatus such as that shown in FIG. 1. Digital storage 700 stores the music sample to be provided to the user. When it is desired to send a particular sample to the user, an identification of the device requesting the sample and a pointer are applied to switch controls 750. The pointer is utilized to access the read function 710 in order to quickly go directly to the location of the start of the music samples. These samples are then copied and transferred to buffers 720 for transmission to a specified end user. Accordingly, when the music samples have been transferred from digital storage 700 to buffers 720, they are then transmitted over modulator 730 and antenna 740 to the user. As shown in FIG. 7, each modulator 730 has a unique frequency $f_i$ so that together, the apparatus forms a frequency division multiplexed transmission spectrum.

Figure 8:
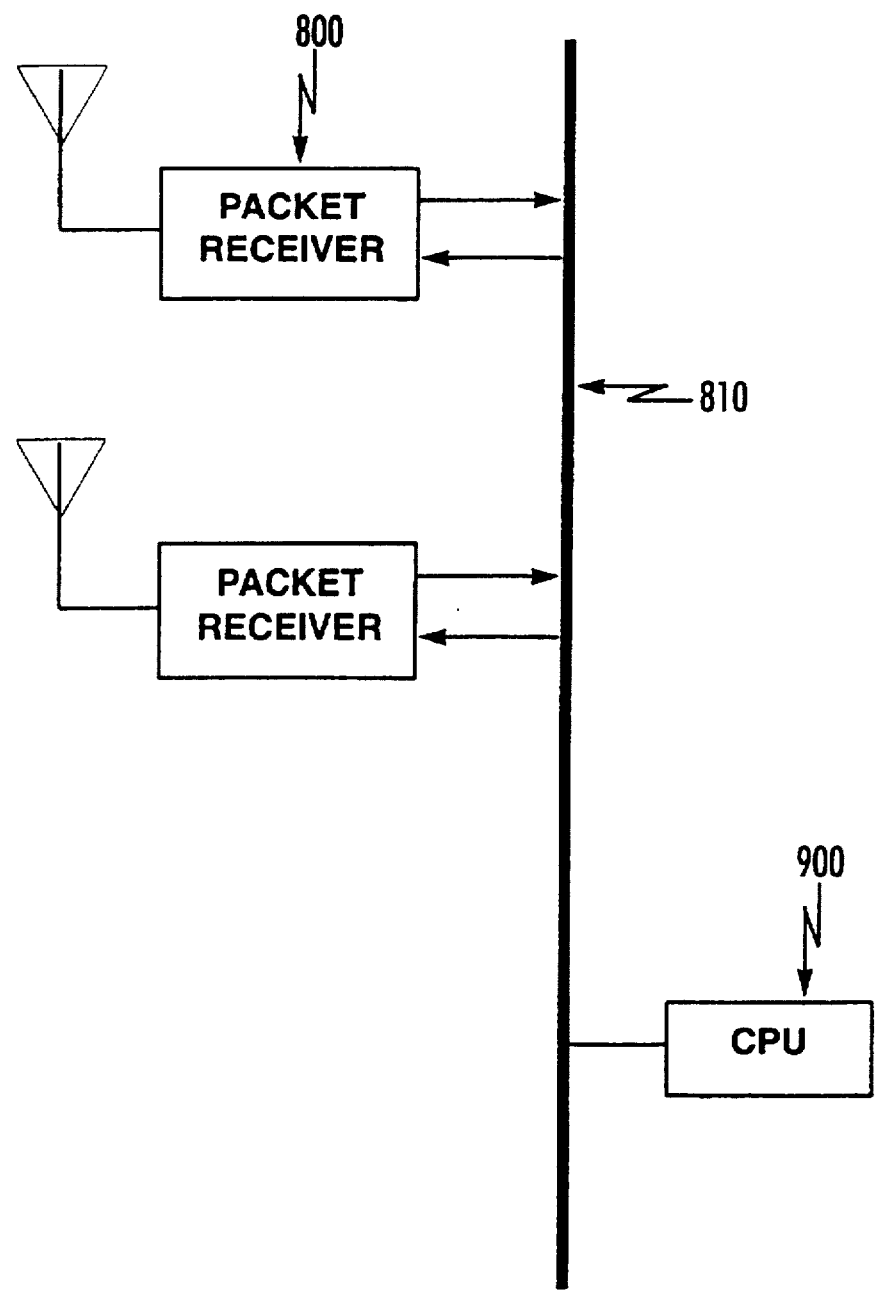
FIG. 8 is an illustration of a central receiving facility for receiving requests for music samples from music sampling apparatuses.

FIG. 8 is an illustration of a central receiving facility for receiving requests for music samples from music sampling apparatus. As shown in FIG. 8, a plurality of packet receivers 800 is provided, one for each incoming frequency. Data from the packet receiver is passed to the bus either on an interrupt basis or on a polling basis.

Figure 9:
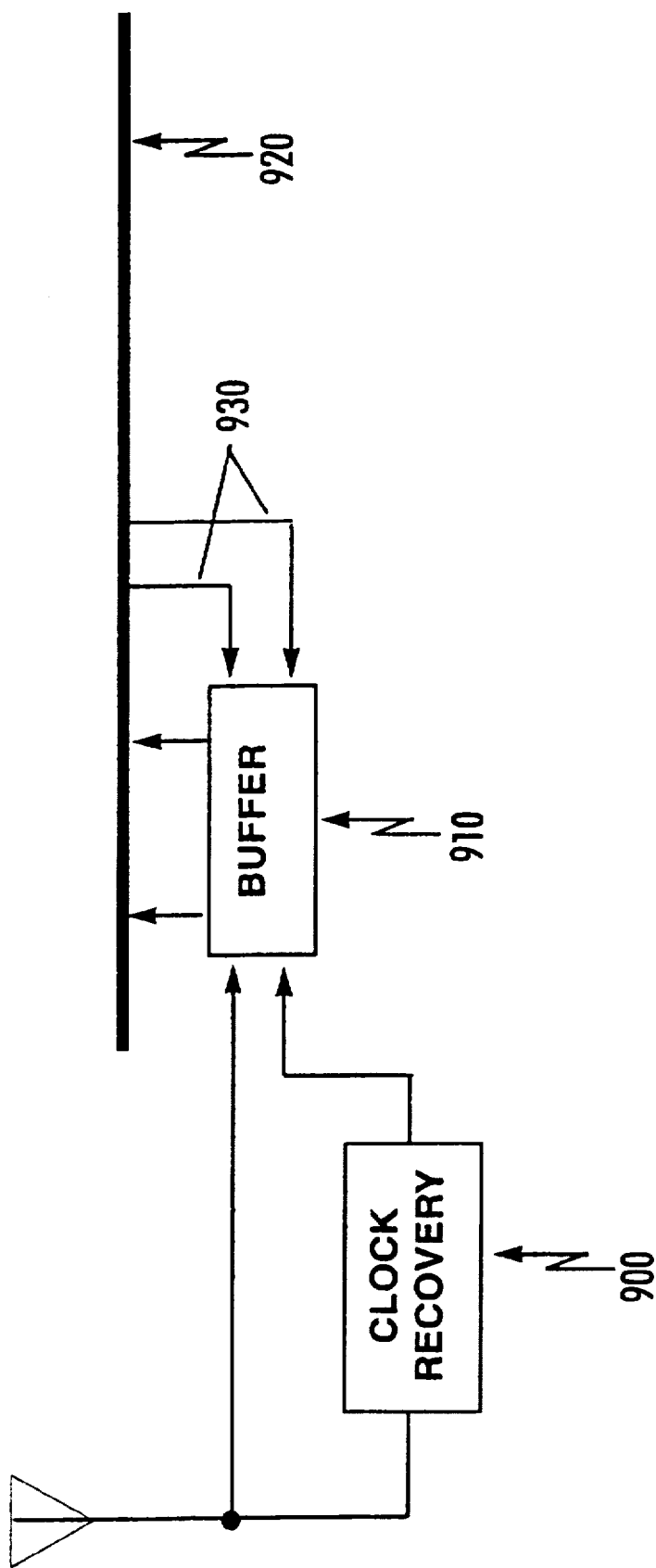
FIG. 9 is a block diagram of a packet receiver such as shown in FIG. 8.

FIG. 9 is a block diagram of a packet receiver such as those shown in FIG. 8. Packets incoming to the store computer from the music sampling apparatus discussed above, are subjected to clock recovery (900). Clock recovery circuit 900 utilizes the synchronization portion of the packet discussed above to establish correct timing for loading of incoming data beginning with the start of header indicator into the buffer 910. When the computer desires to extract a packet from buffer 910, it will initiate a request thereto over the bus and over lines 930. If the requested packet is there, it is transferred in parallel to bus 920 to be directed to the CPU. The CPU can selectively address buffers 910 individually or as part of a polling sequence. Alternatively, the buffer could be interrupt driven so that it requests the services of the CPU only when an action occurs which requires the CPU's attention.

Figure 10:
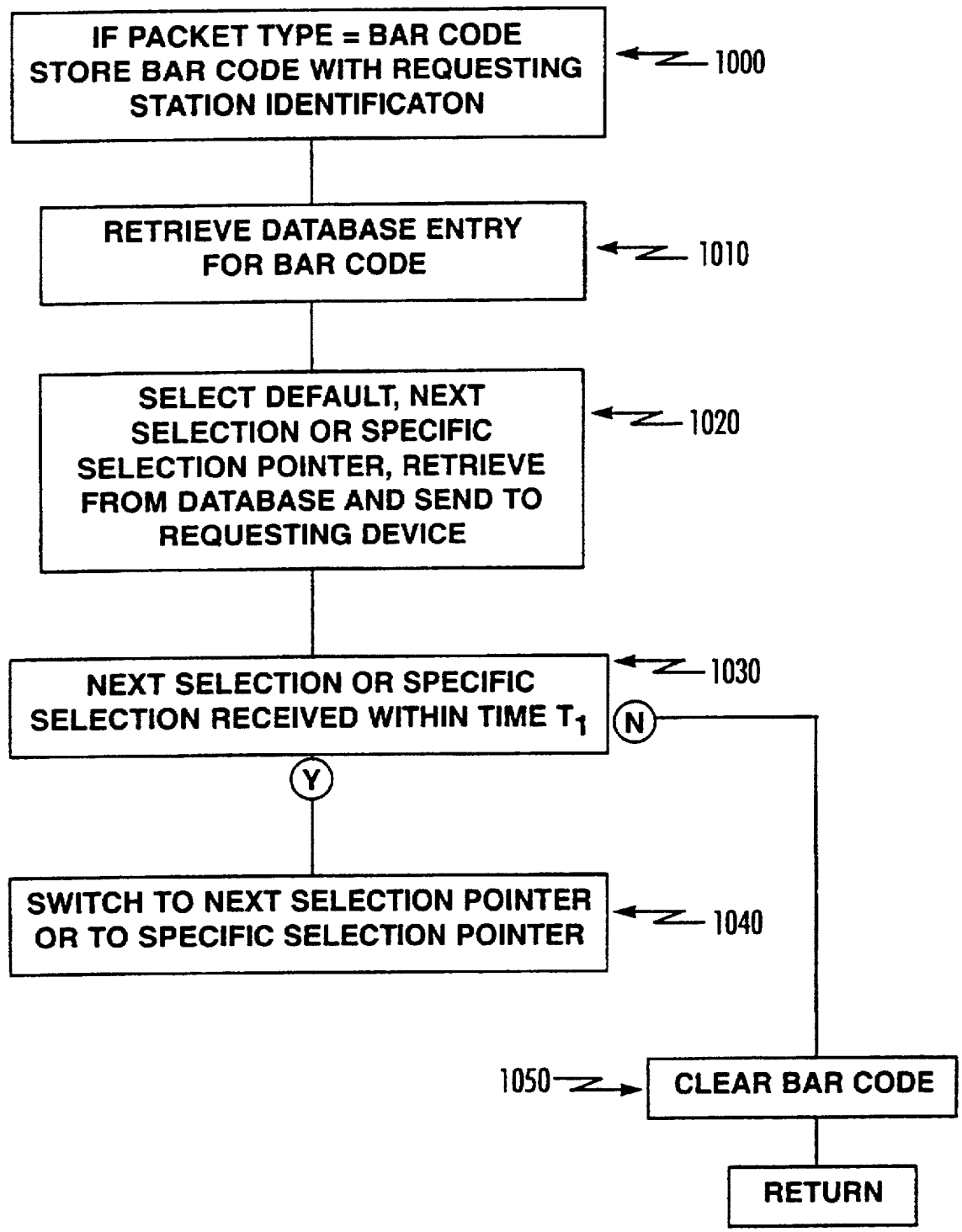
FIG. 10 is a flowchart of a process for responding to packets sent from music sampling apparatuses.

FIG. 10 is a flowchart of a process for responding to packets sent from music sampling apparatus. As indicated above, each music sampling apparatus has its own frequency. If a packet type received over that frequency is of type=bar code, the bar code is stored with the requesting station identification (1000). In response to receipt of a bar code identification, the database entry for that bar code is retrieved, thus making available a list of pointers to locations in memory at which sample selections for the music identified by the bar code are made available.

Once the pointers to the samples have been retrieved, the particular one of them which is specified as a default or is specified as the "next selection" or is specified as part of a specifically received address pointing to it, the sample is retrieved from the database and sent to the requesting device (1020). After a period of time, T1, has expired with no selection being made, the bar code is cleared in memory and the process returns to monitoring for an incoming packet. If the next selection is received within time t1, the process loops back to before block 1020.

Figure 11:
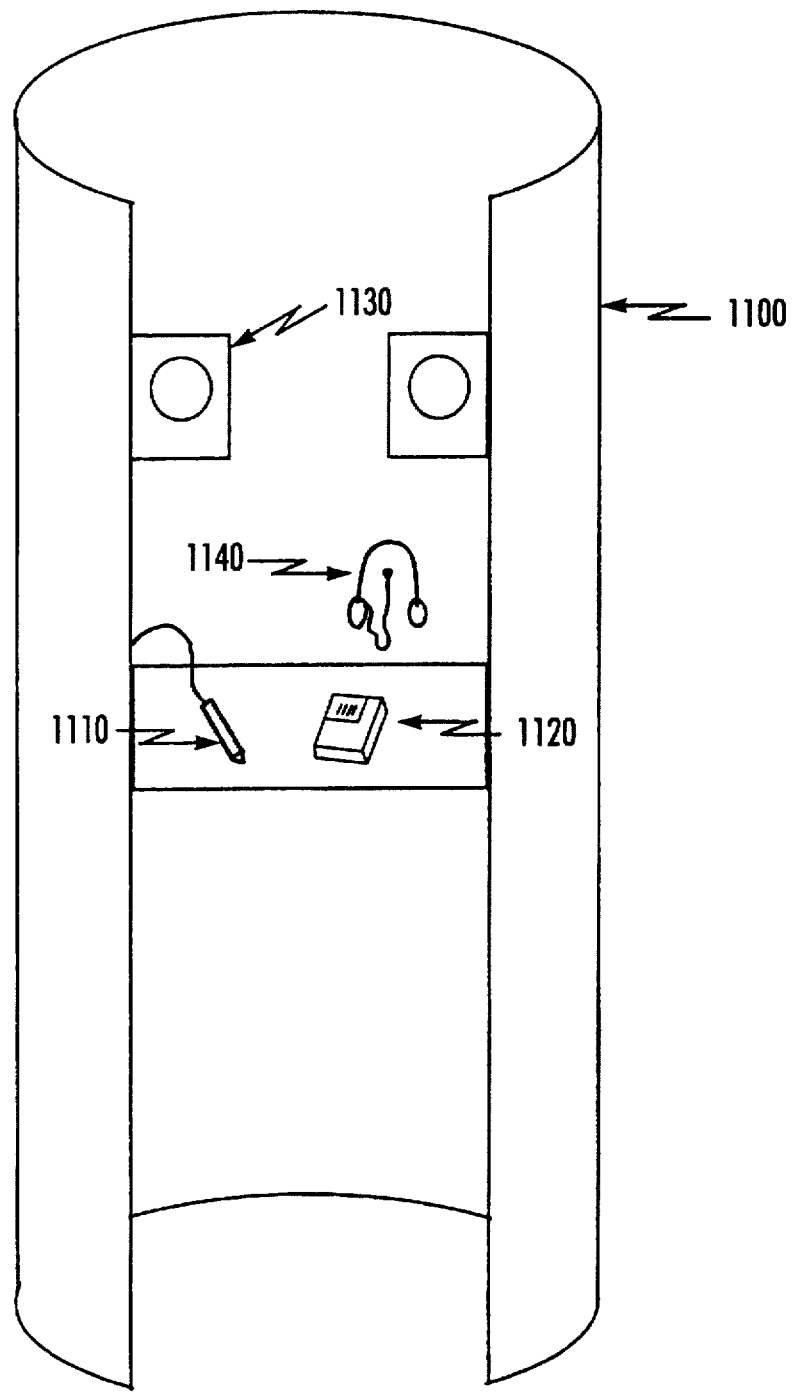
FIG. 11 is an example of a music sampling apparatus built into a kiosk.

FIG. 11 is an example of a music sampling apparatus built into a kiosk. As shown in FIG. 11, kiosk 1100 contains a music sampling apparatus 1110, earphones 1140 and speakers 1130. A piece of music, such as CD ROM 1120 illustrated in FIG. 11 is brought into the booth and the bar code scanned using bar code reader 1110. Music samples then begin played and can be heard either over speakers 1130 or using earphones 1140.

Thus, in accordance with the invention, a music sampling apparatus is described for use in a music store which overcomes the problems of the prior art and provides both the music store owner and the purchaser with improved capabilities for sampling music.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for sampling music, comprising:
   a. a pen sized portable bar code reader, having a battery an earphone jack and a wireless transceiver for scanning a product identification code on music packaging;
   b. said wireless transmitter/receiver for receiving said product identification code from said portable bar code reader and transmitting it to a computer at a remote location which stores digital music samples and receiving back said music samples from said computer; and c. an audio output for receiving and converting said music samples from said computer and providing them to a listener over said earphone jack integrated in said apparatus;

in which said apparatus is in the shape of a pen and said bar code reader is positioned in the point of the pen.

2. Apparatus of claim 1 in which said wireless transmitter/receiver is an infrared transmitter receiver.

3. Apparatus of claim 1 in which said wireless transmitter/receiver is a radio transmitter receiver.

4. Apparatus of claim 1 further comprising a selector switch connected to said transmitter receiver for signalling a request for a different sample.

* * * * *